United States Patent
Ben Khadhra et al.

(10) Patent No.: US 10,953,831 B2
(45) Date of Patent: Mar. 23, 2021

(54) POLARIMETRIC RADAR SYSTEM AND METHOD FOR DETECTING AND CLASSIFYING VEHICLE OCCUPANTS AND OTHER OBJECTS IN A VEHICLE INTERIOR

(71) Applicant: IEE INTERNATIONAL ELECTRONICS & ENGINEERING S.A., Echternach (LU)

(72) Inventors: Kais Ben Khadhra, Mamer (LU); Oscar Gomez, Paris (FR); Jochen Landwehr, Trier (DE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 21 days.

(21) Appl. No.: 16/461,587

(22) PCT Filed: Nov. 23, 2017

(86) PCT No.: PCT/EP2017/080256
§ 371 (c)(1),
(2) Date: May 16, 2019

(87) PCT Pub. No.: WO2018/096053
PCT Pub. Date: May 31, 2018

(65) Prior Publication Data
US 2019/0366965 A1 Dec. 5, 2019

(30) Foreign Application Priority Data
Nov. 25, 2016 (LU) .......................... 93 324

(51) Int. Cl.
*B60R 21/015* (2006.01)
*B60N 2/00* (2006.01)
(Continued)

(52) U.S. Cl.
CPC ........ *B60R 21/01534* (2014.10); *B60N 2/002* (2013.01); *G01S 13/04* (2013.01);
(Continued)

(58) Field of Classification Search
CPC ... B60R 21/01534; B60N 2/002; G01S 13/04; G01S 13/34; G01S 13/42; G01S 13/56;
(Continued)

(56) References Cited

U.S. PATENT DOCUMENTS 7,983,817 B2  7/2011  Breed
9,341,687 B2 * 5/2016  Donnangelo .......... G01N 27/02
(Continued)

FOREIGN PATENT DOCUMENTS

DE  102015200939 A1  7/2016
EP      2653882 A1   10/2013
(Continued)

OTHER PUBLICATIONS

International Search Report corresponding to International Application No. PCT/EP2017/080256, dated Nov. 23, 2017, 4 pages.
(Continued)

*Primary Examiner* — Amandeep Saini
(74) *Attorney, Agent, or Firm* — Reising Ethington P.C.

(57) ABSTRACT

A polarimetric radar system for detecting and classifying objects positioned in an interior of a vehicle includes a radar transmitter unit for transmitting radar waves of at least two different polarizations, a radar receiving unit for receiving radar waves of at least two different polarizations, a radar signal generating unit for generating and providing radar waves to be transmitted by the at least one radar transmitter unit, a signal processing circuitry for processing the generated radar waves and the received radar waves and a signal evaluation unit that is configured to receive processed signals from the signal processing circuitry, to estimate values
(Continued)

for a set of predetermined object parameters on the basis of the received processed signals, and to select an object class upon detecting a match of the estimated values for the set of object parameters with one out of a plurality of predetermined sets of object parameters.

14 Claims, 6 Drawing Sheets

(51) Int. Cl.
*G01S 13/04* (2006.01)
*G01S 13/34* (2006.01)
*G01S 13/42* (2006.01)
*G01S 13/56* (2006.01)
*G06K 9/00* (2006.01)

(52) U.S. Cl.
CPC .............. *G01S 13/34* (2013.01); *G01S 13/42* (2013.01); *G01S 13/56* (2013.01); *G06K 9/00362* (2013.01)

(58) Field of Classification Search
CPC .... G01S 13/872; G01S 13/584; G01S 13/343; G01S 7/415; G01S 7/025; G01S 7/412; G01S 7/414; G01S 13/003; G06K 9/00362; G06K 9/00832
USPC ......................................................... 382/103
See application file for complete search history.

(56) References Cited

U.S. PATENT DOCUMENTS

| | | |
|---|---|---|
| 2007/0194976 A1* | 8/2007 | Reed ..................... G01S 7/411 342/22 |
| 2012/0232749 A1 | 9/2012 | Schoenberg et al. |
| 2016/0025839 A1 | 1/2016 | Trummer |
| 2016/0200276 A1 | 7/2016 | Diewald |
| 2016/0311388 A1 | 10/2016 | Diewald |
| 2017/0168156 A1 | 6/2017 | Hoare et al. |

FOREIGN PATENT DOCUMENTS

| | | |
|---|---|---|
| GB | 2523092 A | 8/2015 |
| JP | 2004085564 A | 3/2004 |
| WO | WO2015022358 A1 | 2/2015 |
| WO | WO2015086346 A1 | 6/2015 |
| WO | WO2015140333 A1 | 9/2015 |
| WO | WO2018087365 A1 | 5/2018 |

OTHER PUBLICATIONS

Written Opinion corresponding to International Application No. PCT/EP2017/080256, dated Nov. 23, 2017, 6 pages.
Martin-Wolfgang Boerner, "Basic Concepts in Radar Polarimetry", http://earth.esa.int/landtraining07/polsar_basic_concepts.pdf, accessed Apr. 27, 2019, 100 pages.
Eric Shih-Syou Li, "Millimeter-Wave Polarimetric Radar System as an Advanced Vehicle Control and Warning Sensor", Doctoral Thesis, dated Oct. 1, 1998, 221 pages.

* cited by examiner

POLARIMETRIC RADAR SYSTEM AND METHOD FOR DETECTING AND CLASSIFYING VEHICLE OCCUPANTS AND OTHER OBJECTS IN A VEHICLE INTERIOR

TECHNICAL FIELD

The invention relates to a polarimetric radar system for detecting and classifying objects positioned in a vehicle interior, a method for classifying at least one object positioned in a vehicle interior by using such polarimetric radar system, and a software module for controlling automatic execution of the method.

BACKGROUND OF THE INVENTION

Vehicle interior occupant sensing technologies are nowadays widely used, for instance for detection of left-behind pets and/or children, vital sign monitoring, vehicle seat occupancy detection for seat belt reminder (SBR) systems, or anti-theft alarm.

An example for employing an optically based sensing technology is disclosed in U.S. Pat. No. 7,983,817 B2, which describes an arrangement and a method for obtaining information about a vehicle occupant in a compartment of the vehicle in which a light source is mounted in the vehicle. Structured light, for instance formed by a pattern of infrared beams or formed by polarizing the rays of light from the light source, is projected into an area of interest in the compartment. The structured light originating from the light source and being reflected is detected at an image sensor at a position different than the position from which the structured light is projected. The reflected light is analyzed relative to the projected structured light to obtain information about the area of interest. The structured light is designed to appear as if it comes from a source of light (virtual or actual) which is at a position different than the position of the image sensor. A classification is described to be executed by a neural network using a pattern recognition algorithm, and is thus based on a 3D profile of the vehicle occupant. Classification is described to be more difficult under ambient light condition because the background is illuminated by sunlight, and sometimes the bright sunlight projects sharp shadows onto the seat, which creates pattern in feature vectors used for pattern recognition.

Patent application publication US 2012/0232749 A1 describes a system for providing remote notice that a child is in a car seat. The system comprises a child detector, for example a pressure sensor, placed in a vehicle, the child detector detecting the presence of a child in a vehicle; a motion sensor, the motion sensor detecting that the vehicle is in motion; a computer processor obtaining the output of the child detector and the motion sensor and determining if a child is in the vehicle when the vehicle is not in motion; and a communication device for transmitting the determination of the processor to a receiver, the receiver displaying to a user a result of the determination. One child detector is required for each seat.

International application WO 2015/140333 A1 describes a method and system for ascertaining whether an unattended child is present within an automotive vehicle. The method uses a radar sensor system comprising a transmitter, and at least one sensor and processing circuitry. The method comprises: illuminating at least one occupiable position within the vehicle with radiation, the radiation exhibiting multiple frequencies; generating radar sensor signals from radiation reflected as a result of the transmitted radiation, a plurality of the radar sensor signals corresponding to different frequencies; operating the processing circuitry for generating, based on the radar sensor signals, a first indicator value, the first indicator value indicating a degree of motion associated with the occupiable position; determining whether the first indicator value satisfies a first predetermined criteria; if the first indicator value satisfies the first predetermined criteria, generating, based on radar sensor signals, a second indicator value, the second indicator value indicating a degree of repetitive pattern within the radar sensor signals; and determining that an unattended child is present within the automotive vehicle if the second indicator value satisfies a second predetermined criteria.

Radar polarimetry deals with measuring the polarization state of a radar frequency electromagnetic wave when the electromagnetic wave is re-polarized after it hits a radar target or a scattering surface, and is reflected. In radar polarimetry, the polarization state of radar waves under scattering conditions is usually described by formalisms including complex matrices.

Formally, the incident radar wave can be described by a two-component vector, wherein the vector components represent complex electric fields in a horizontal ($E_h^i$) and a vertical direction ($E_v^i$), respectively. The reflected or scattered radar wave can be described by another two-component vector with vector components representing complex electric fields in the horizontal ($E_h^s$) and the vertical direction ($E_v^s$). In this formalism, each scattering object is considered a polarization transformer, and the transformation from a transmitted wave vector to a received wave vector can be described as applying a matrix called scattering matrix to the vector representing the incident radar wave.

$$\begin{bmatrix} E_h^s \\ E_v^s \end{bmatrix} = \begin{bmatrix} S_{hh} S_{hv} \\ S_{vh} S_{vv} \end{bmatrix} \cdot \begin{bmatrix} E_h^i \\ E_v^i \end{bmatrix}$$

The diagonal matrix elements are usually called copolarized, the non-diagonal elements are called cross-polarized. This matrix contains all the information about the scattering process and the scatterer itself. Elements of the scattering matrix or an equivalent matrix, for instance the known Covariance matrix and the Coherency matrix, are observable power terms. Different relevant matrix formalisms exist and are used in radar polarimetry, such as Jones Matrix, S-matrix, Müller M-matrix and Kennaugh K-matrix. By measuring the scattering matrix or an equivalent, the strength and polarization of the scattered radar wave for an arbitrary polarization of the incident wave can be computed.

An outline of mathematical methods of treating scattering matrices and of extracting the information contained in a measured scattering matrix of observed power terms can be found, for instance, in Wolfgang-Martin Boerner, "*Basic Concepts in Radar Polarimetry*", PolSARpro v3.0—Lecture Notes (available at http://earth.esa.int/landtraining07/polsar-_basic_concepts.pdf). This document shall hereby be incorporated by reference in its entirety with effect for the jurisdictions permitting incorporation by reference.

SUMMARY

It is an object of the invention to provide a radar system that is capable of reliably and effectively detecting and classifying objects (human beings, animals, inanimate objects) positioned in an interior of a vehicle, generating a low number of false positive or false negative classifications on any alleged presence of an object in the interior of the vehicle.

In one aspect of the present invention, the object is achieved by a polarimetric radar system that is configured for detecting and classifying objects positioned in an interior of a vehicle.

The phrase "configured to", as used in this application, shall in particular be understood as being specifically programmed, laid out, furnished or arranged. The term "vehicle", as used in this application, shall particularly be understood to encompass passenger cars, trucks and buses.

The polarimetric radar system comprises at least one radar transmitter unit, at least one radar receiving unit, a radar signal generating unit, a signal processing circuitry and a signal evaluation unit.

The at least one radar transmitter unit is configured to transmit radar waves of at least two different polarizations. The at least one radar receiving unit is configured to receive radar waves of at least two different polarizations. The radar signal generating unit is configured to generate and to provide radar waves to be transmitted by the at least one radar transmitter unit. The signal processing circuitry is configured to process the generated radar waves to be transmitted and the received radar waves. The signal evaluation unit is configured to receive processed signals from the signal processing circuitry and to estimate values for a permittivity of an object e.g. from a copolarized ratio of radar power derived from the received processed signals or to estimate values for a set of predetermined object parameters, including the permittivity of an object, on the basis of the received processed signals. The signal evaluation unit is further configured to select an object class that corresponds to a specific permittivity out of a plurality of permittivities from a plurality of predetermined object classes upon detecting a match of the estimated value of permittivity with the specific permittivity or to a specific predetermined set of object parameters, including the permittivity of an object, out of a plurality of predetermined sets of object parameters from a plurality of predetermined object classes upon detecting a match of the estimated values for the set of object parameters with the specific predetermined set of object parameters.

Moreover, the signal evaluation unit is configured to provide an information that is indicative of the at least one classified object.

The term "received radar waves", as used in this application, shall particularly be understood as radar waves that are generated from transmitted radar waves by being reflected or scattered by objects located in the interior of the vehicle. This can, for instance, be ensured by an appropriate arrangement of the at least one radar transmitter unit and the at least one radar receiving unit within the interior of the vehicle.

The term "object parameter", as used in this application, shall particularly be understood as a parameter that is characteristic for a specific object, and by that, can serve to distinguish the specific object from other objects. Examples of object parameters include, but are not limited to, size, distance, position with respect to vehicle interior, mutual position between at least two objects, relative velocity, vital signs (breathing, heart rate etc.), and electric properties such as e.g. permittivity.

The transmitted radar waves are understood to be transmitted to at least partially cover the interior of the vehicle, where objects under consideration are to be expected.

In this way, a radar system for automotive applications with a low number of false negative classification results and a low number of false positive classification results can be provided.

The information that is indicative of the at least one classified object can be provided to an electronic control of the vehicle and/or to a call center and/or to a central emergency center and/or to a remote telecommunication means, such as a smartphone, wherein the term "remote telecommunication means", as used in this application, shall in particular encompass any telecommunication means that is located outside the interior of the vehicle.

The provision of the classification information can depend on a fulfillment of one or more predetermined conditions.

The classifying may comprise a group of classes that includes, but is not limited to, "child", "adult", "pet" and "inanimate object".

Preferably, a predetermined set of object parameters comprises a predetermined range for each parameter of the set of object parameters. The term "match", as used in this application, shall particularly be understood such that each estimated value for an object parameter of the set of predetermined object parameters shall lie within the predetermined range for the parameter, for all parameters of the set of object parameters.

Also preferably, the at least one radar transmitter unit is capable of providing continuous-wave (CW) radar energy.

In preferred embodiments, the polarimetric radar system further comprises modulation means for generating frequency-modulated (FM) radar waves (more preferred: frequency-modulated continuous-wave (FMCW)) to be transmitted by the at least one radar transmitter unit, and moreover comprises demodulation means for demodulating the received radar waves.

By that, absolute velocity and distance can be added as characteristic and important object parameters to the set of object parameters, thus facilitating improved classifying performance.

Preferably, the generated frequency-modulated radar waves to be transmitted are modulated linear in time. The radar frequency of the at least one radar transmitter unit may, for instance, slew up or down as a sawtooth wave or a triangle wave.

In some embodiments of the polarimetric radar system, the signal evaluation unit includes a microcontroller having at least one processor unit and at least one digital data memory unit to which the processor unit has data access. In this way, an automated measurement procedure of classifying objects ahead of a vehicle with the polarimetric radar system can be enabled.

A fast and undisturbed digital signal processing can be accomplished if the microcontroller further includes analog-to-digital converters that are electrically connected to the radar receiving unit. Such equipped microcontrollers are commercially available nowadays in many variations and at economic prices.

In some embodiments of the polarimetric radar system, the at least one radar transmitter unit comprises at least one transmitting antenna that is arrangeable in the interior of the vehicle, and the at least one radar receiving unit comprises at least one receiving antenna that is arrangeable in the interior of the vehicle. In this way, transmission of radar waves towards objects that are potentially located in the interior of the vehicle and receiving radar waves that are generated from transmitted radar waves by being reflected or scattered by such objects can readily be accomplished.

Preferably, the at least one transmitting antenna and the at least one receiving antenna are arranged apart from each other in a spaced manner (bi-static arrangement), but a mono-static arrangement, in which the at least one transmitting antenna and the at least one receiving antenna are located nearby is also contemplated.

Preferably, the signal evaluation unit is configured to select an object class from a plurality of predetermined object classes in real time. The phrase "in real time", as used in this application, shall particularly be understood as a response within specified and predetermined time constraints, which are appropriate for the specific application, such that an optimized reaction, for instance by the electronic control unit of the vehicle or by an emergency team can be facilitated.

In some embodiments of the polarimetric radar system, the at least one radar transmitter unit comprises a plurality of transmitting antennas and/or the at least one radar receiving unit comprises a plurality of receiving antennas. In this way, shadow effects with regard to transmitting radar waves towards objects that are potentially located in the interior of the vehicle and with regard to receiving radar waves that are generated from transmitted radar waves by being reflected or scattered by such objects can be avoided.

In some embodiments of the polarimetric radar systems, wherein the at least one radar transmitter unit comprises a plurality of transmitting antennas and/or the at least one radar receiving unit comprises a plurality of receiving antennas, at least one of the plurality of transmitting and the plurality of receiving antennas is formed as a phased-array of antennas.

This allows for applying one of the commonly known digital beam forming techniques to enable distinguishing of and classifying more than one object within the interior of the vehicle. In a suitable embodiment of the polarimetric radar system, the phased-array of antennas can be used in combination with an appropriate digital beam forming technique to generate a real-time image of the copolarized ratio of the received radar power (copolarized: transmitted and received polarizations are the same) derived from the measurement of the radar waves reflected or scattered by an object, of a footprint in the field of view.

In another aspect of the invention, a method of classifying at least one object positioned in an interior of a vehicle by using a polarimetric radar system as disclosed herein is provided. The method comprises the following steps:
- illuminating the interior of the vehicle with radar waves having at least two different polarizations,
- receiving radar waves of at least two different polarizations that are reflected by the at least one object to be classified,
- estimating values for a set of predetermined object parameters on the basis of the received radar waves,
- comparing the estimated values for a set of predetermined object parameters with a plurality of predetermined sets of object parameters,
- upon detecting a match of the estimated values for the set of object parameters with a specific predetermined set out of the plurality of predetermined sets of object parameters, assigning the class corresponding to the specific predetermined set to the at least one object, and
- providing an information that is indicative of the at least one classified object.

The benefits described in context with the disclosed polarimetric radar system apply to the method to the full extent.

Again, the information can be provided to an electronic control unit of the vehicle and/or to a call center and/or to a central emergency center and/or to a remote telecommunication means, such as a smartphone.

Preferably, the step of illuminating the interior of the vehicle comprises illuminating the vehicle interior with frequency-modulated continuous radar waves (FMCW). This allows for adding absolute velocity, particularly perpendicular to the line of sight, and distance to the set of object parameters for facilitating improved classifying performance.

Thus, in some embodiments of the method, the step of estimating values for a set of predetermined object parameters includes estimating a position of the at least one object with respect to the interior of the vehicle. For instance, this can be achieved by exploiting a frequency content of the received radar waves. The term "position" as used in this application, shall in particular be understood to encompass direction and distance relative to the at least one receiving antenna.

In some embodiments of the method, the step of estimating values for a set of predetermined object parameters includes estimating a permittivity of the at least one object from a copolarized ratio of radar power (copolarized: transmitted and received polarizations are the same) derived from the measurement of the radar waves reflected or scattered by the at least one object.

The permittivity of an object is a complex number. The permittivity is estimated for the specific frequency of the transmitted incident radar wave. In this way, the permittivity can be added to the set of predetermined object parameters, which allows classifying of and distinguishing between human beings or animals and inanimate objects.

An especially beneficial solution can be accomplished if the step of estimating values for a set of predetermined object parameters includes estimating a permittivity of the object from a copolarized ratio of radar power derived from the measurement of the radar waves reflected by an object in the specular direction. In this direction an incidence angle is equal to a scattering angle, and for all surface scattering models (smooth, medium rough and rough), the copolarized ratio of the scattering coefficients is independent of the target roughness. The independency of the copolarized ratio of the scattering coefficients can further improve the effectiveness and reliability of the disclosed method.

In some embodiments of the method, the step of estimating values for a set of predetermined object parameters includes steps of performing a polarimetric decomposition of a matrix formed by making use of the received radar waves, and identifying at least one object from the polarimetric decomposition.

The polarimetric decomposition is a presentation of the matrix that describes the reflection or scattering of the incident radar waves as a linear sum of basis matrices multiplied with corresponding coefficients to express the matrix as a linear sum of scattering mechanisms.

Many schemes of performing a polarimetric decomposition of a scattering matrix are known in the art and are described in relevant textbooks, and also in the cited reference of Wolfgang-Martin Boerner, "*Basic Concepts in Radar Polarimetry*". Some polarimetric decompositions are model-based and require a priori knowledge about the nature of the scattering object as an input, and some polarimetric decomposition schemes are not model-based. Both types of polarimetric decomposition schemes are contemplated for use in the method disclosed herein.

In yet another aspect of the invention, a software module for controlling automatic execution of steps of an embodiment of the method disclosed herein is provided.

The method steps to be conducted are converted into a program code of the software module, wherein the program code is implementable in a digital memory unit of the polarimetric radar system; that is, it is stored on the computer-readable medium and is executable by a processor unit of the polarimetric radar system. Preferably, the digital memory unit and/or processor unit may be a digital memory unit and/or a processing unit of the signal evaluation unit of the polarimetric radar system. The processor unit may, alternatively or supplementary, be another processor unit that is especially assigned to execute at least some of the method steps.

The software module can enable a robust and reliable execution of the method in an automatic manner and can allow for a fast modification of method steps.

These and other aspects of the invention will be apparent from and elucidated with reference to the embodiments described hereinafter.

BRIEF DESCRIPTION OF THE DRAWINGS

Further details and advantages of the present invention will be apparent from the following detailed description of not limiting embodiments with reference to the attached drawing, wherein.

DESCRIPTION OF THE ILLUSTRATED EMBODIMENTS

Figure 1:
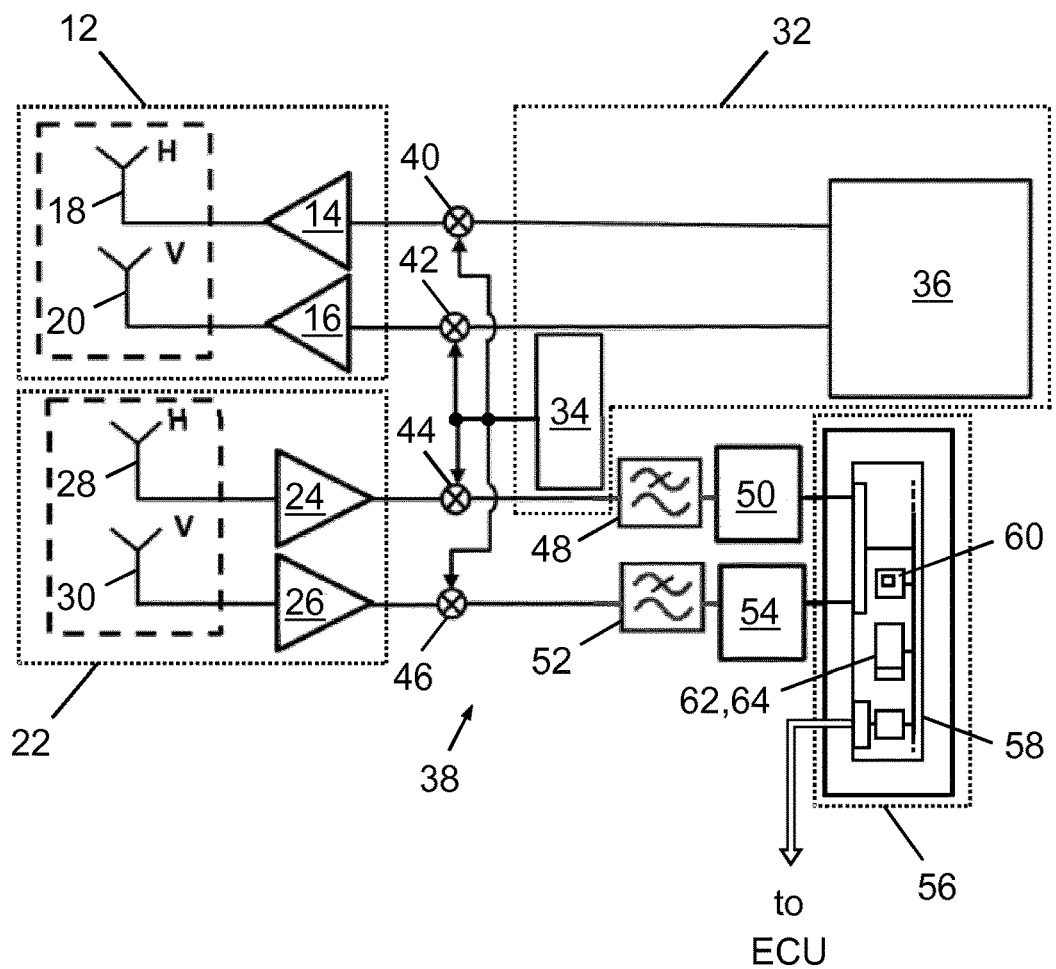
FIG. 1 is a schematic circuit diagram of an embodiment of the polarimetric radar system in accordance with the invention.
Figure 2:
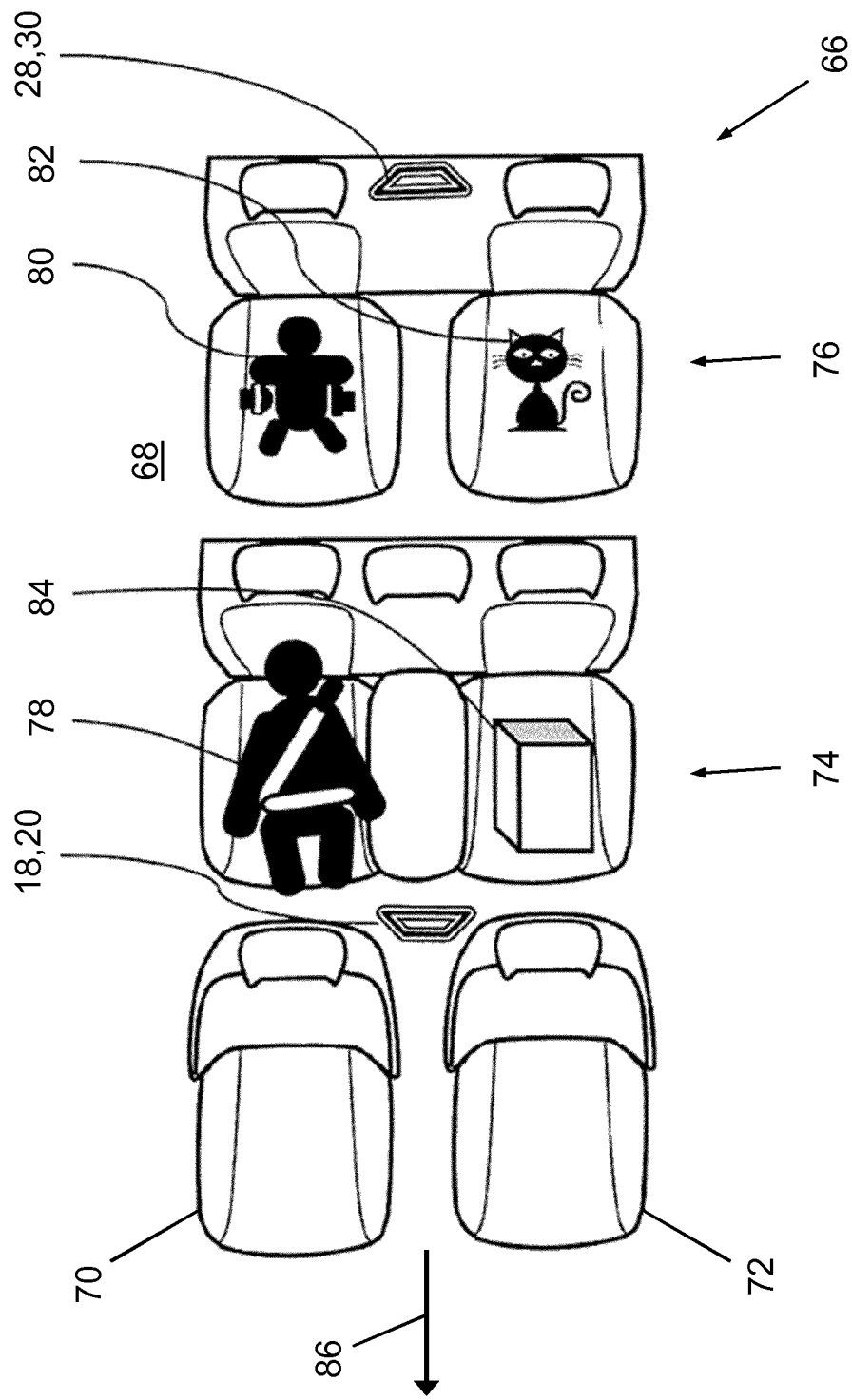
FIG. 2 is a schematic illustration of the embodiment of the polarimetric radar system pursuant to FIG. 1 installed in a vehicle, in a top view.

FIG. 1 is a schematic circuit diagram of an embodiment of the polarimetric radar system 10 in accordance with the invention, for detecting and classifying objects positioned in an interior of a vehicle. FIG. 2 is a schematic illustration of the embodiment of the polarimetric radar system 10 in a state of being installed in the vehicle 66 in a top view. The vehicle 66 is designed as a passenger car, namely a minivan (large multi-purpose vehicle). An interior 68 of the vehicle 66 comprises two juxtaposed separate front seats 70, 72, a middle seat row 74 with two seats plus an auxiliary seat in juxtaposed position between the two seats, and a rear seat row 76 of two juxtaposed separate seats.

The polarimetric radar system 10 includes
a radar transmitter unit 12,
a radar receiving unit 22,
a radar signal generating unit 32,
a signal processing circuitry 38, and
a signal evaluation unit 56.

The radar transmitter unit 12 comprises a first amplifier 14 and a second amplifier 16, which are identically designed, and two transmitting antennas 18, 20 that are designed as patch antennas. A first one 18 of the two transmitting antennas 18, 20 is configured to transmit radar waves with a horizontal polarization. A second one 20 of the two transmitting antennas 18, 20 is configured to transmit radar waves with a vertical polarization. Each one of the amplifiers 14, 16 is electrically connected with an output port to one of the transmitting antennas 18, 20. The two transmitting antennas 18, 20 are arranged at a roof of the interior 68 of the vehicle 66 at a center position above the front seats 70, 72 of the vehicle 66, and are directed opposite to a normal driving direction 86 in an orientation that is somewhat tilted towards a floor of the interior 68. The radar transmitter unit 12 is therefore configured for transmitting radar waves of horizontal and vertical polarization to partially cover the interior 68 of the vehicle 66, namely the middle seat row 74 and the rear seat row 76, where objects 78, 80, 82, 84 under consideration are to be expected. Examples of potential objects 78, 80, 82, 84 are shown in FIG. 2 as an adult 78, a child 80, a pet 82 and an inanimate object 84 formed by a box.

It is noted herewith that the terms "first", "second", etc. are used in this application for distinction purposes only, and are not meant to indicate or anticipate a sequence or a priority in any way.

Although in this specific embodiment the radar transmitter unit 12 comprises two transmitting antennas 18, 20, it is also contemplated for other embodiments that the radar transmitter unit can comprise a plurality of more than two transmitting antennas forming a phased-array of antennas. Additional hardware needs to be provided in this case, for instance for adjusting a phase relationship between the various antennas, as is well known in the art.

Referring again to FIG. 1, the radar receiving unit 22 comprises a first low-noise amplifier 24 and a second low-noise amplifier 26 and two receiving antennas 28, 30 that are designed as patch antennas. A first one 28 of the receiving antennas 28, 30 is configured to receive radar waves having a horizontal polarization. A second one 30 of the two receiving antennas 28, 30 is configured to receive radar waves with a vertical polarization. Each one of the receiving antennas 28, 30 is electrically connected to an input port of one of the low-noise amplifiers 24, 26. The two receiving antennas 28, 30 are arranged at the roof of the interior 68 of the vehicle 66 (FIG. 2) at a center position above the seats of the rear seat row 76 with their main sensitivity lobes pointing in the normal driving direction 86. The two receiving antennas 28, 30 are suitably tilted towards the floor of the interior 68 so as to avoid to directly receive radar waves transmitted by the two transmitting antennas 18, 20, and are arranged in a spaced manner with respect to the two transmitting antennas 18, 20. The radar receiving unit 22 is therefore configured for receiving radar waves of horizontal and vertical polarization that are generated from radar waves transmitted by the radar transmitting antennas 18, 20 and reflected or scattered by objects 78, 80, 82, 84 located in the interior 68 of the vehicle 66.

As an alternative to the tilting of the transmitting antennas 18, 20 and the receiving antennas 28, 30 towards the floor, an appropriate radar screen can be located at the transmitting antennas 18, 20 to avoid direct transmission of radar waves to the receiving antennas 28, 30.

Although in this specific embodiment the radar receiving unit 22 comprises two receiving antennas 28, 30, it is also contemplated for other embodiments that the radar receiving unit can comprise a plurality of more than two receiving antennas forming a phased-array of antennas. Additional hardware needs to be provided in this case, for instance for adjusting a phase relationship between the various antennas, as is well known in the art.

With reference to FIG. 1, the radar signal generating unit 32 comprises a radar local oscillator 34 and a sweep generator 36. The radar local oscillator 34 is configured to generate radar waves at a radar frequency of, for instance, about 24.0 GHz, and is capable of operating in a continuous wave-mode. The sweep generator 36 is configured to generate a sinusoidal signal of constant amplitude with a linearly varying frequency with a bandwidth of e.g. 200 MHz at a radar frequency of 24 GHz.

The radar signal generating unit 32 is configured to generate and to provide radar waves to be transmitted by the radar transmitting antennas 18, 20 of the radar transmitter unit 12.

The signal processing circuitry 38 is configured for processing the generated radar waves to be transmitted. To this end, the signal processing circuitry 38 comprises a first 40 and a second electronic multiplying frequency mixer 42 that serve as modulation means. The signal from the sweep generator 36 and the signal from the radar local oscillator 34 are electrically connected to the first frequency mixer 40 and to the second frequency mixer 42. An output signal of the first frequency mixer 40 is fed to the first amplifier 14 of the two amplifiers 14, 16, which serves to supply the first transmitting antenna 18 with radar power. An output signal of the second frequency mixer 42 is conveyed to the second amplifier 16 of the two amplifiers 14, 16, which serves to supply the second transmitting antenna 20 with radar power.

The output signals of the first 40 and the second frequency mixer 42 include a sum and a difference of the frequency of the radar local oscillator 34 and the frequency of the sweep generator 36. The difference frequency signal is eliminated by an appropriate filter (not shown).

In this way, frequency-modulated continuous radar waves can be generated that are to be transmitted via the first transmitting antenna 18 and the second transmitting antenna 20 of the radar transmitter unit 12.

The signal processing circuitry 38 is further configured for processing the received radar waves. To this end, the signal processing circuitry 38 comprises a third 44 and a fourth electronic multiplying frequency mixer 46 that serve as demodulation means. An output port of the first low-noise amplifier 24, which carries a signal of received radar waves with horizontal polarization, and the radar local oscillator 34 are electrically connected to the third frequency mixer 44 of the signal processing circuitry 38. An output port of the second low-noise amplifier 26, which carries a signal of received radar waves with vertical polarization, and the radar local oscillator 34 are electrically connected to the fourth frequency mixer 46 of the signal processing circuitry 38.

The output signals of the third 44 and the fourth frequency mixer 46 include a sum and a difference of the frequency of the radar waves transmitted by the transmitting antennas 18, 20 and the frequency of the radar local oscillator 34. The sum frequency signal is eliminated from the output signal of the third frequency mixer 44 by a subsequent low-pass filter 48 of the signal processing circuitry 38, and only the difference signal is digitally converted by an analog-to-digital converter (ADC) 50. The output signal of the fourth frequency mixer 46 is processed by another low-pass filter 52 and digitally converted by another ADC 54 in the same manner.

The filtered and digitally converted output signals are fed to input ports of the signal evaluation unit 56 that is configured to receive processed signals from the signal processing circuitry 38. The signal evaluation unit 56 includes a microcontroller 58 having a processor unit 60 and a digital data memory unit 62 to which the processor unit 60 has data access. The digital data memory unit 62 comprises a non-transitory computer-readable medium. In FIG. 1, the signal evaluation unit 56 and the ADCs 50, 54 are shown as separate units. Actually, the ADCs 50, 54 may be integral parts of the microcontroller 58.

As will be described in more detail hereinafter, the signal evaluation unit 56 is configured to estimate values for a set of predetermined object parameters on the basis of the received processed signals. The signal evaluation unit 56 is further configured to select an object class that corresponds to a specific predetermined set of object parameters out of a plurality of predetermined sets of object parameters from a plurality of predetermined object classes upon detecting a match of the estimated values for the set of object parameters with the specific predetermined set of object parameters out of the plurality of predetermined sets of object parameters. The microcontroller 58 is configured to select the object class in real-time.

Figure 3:
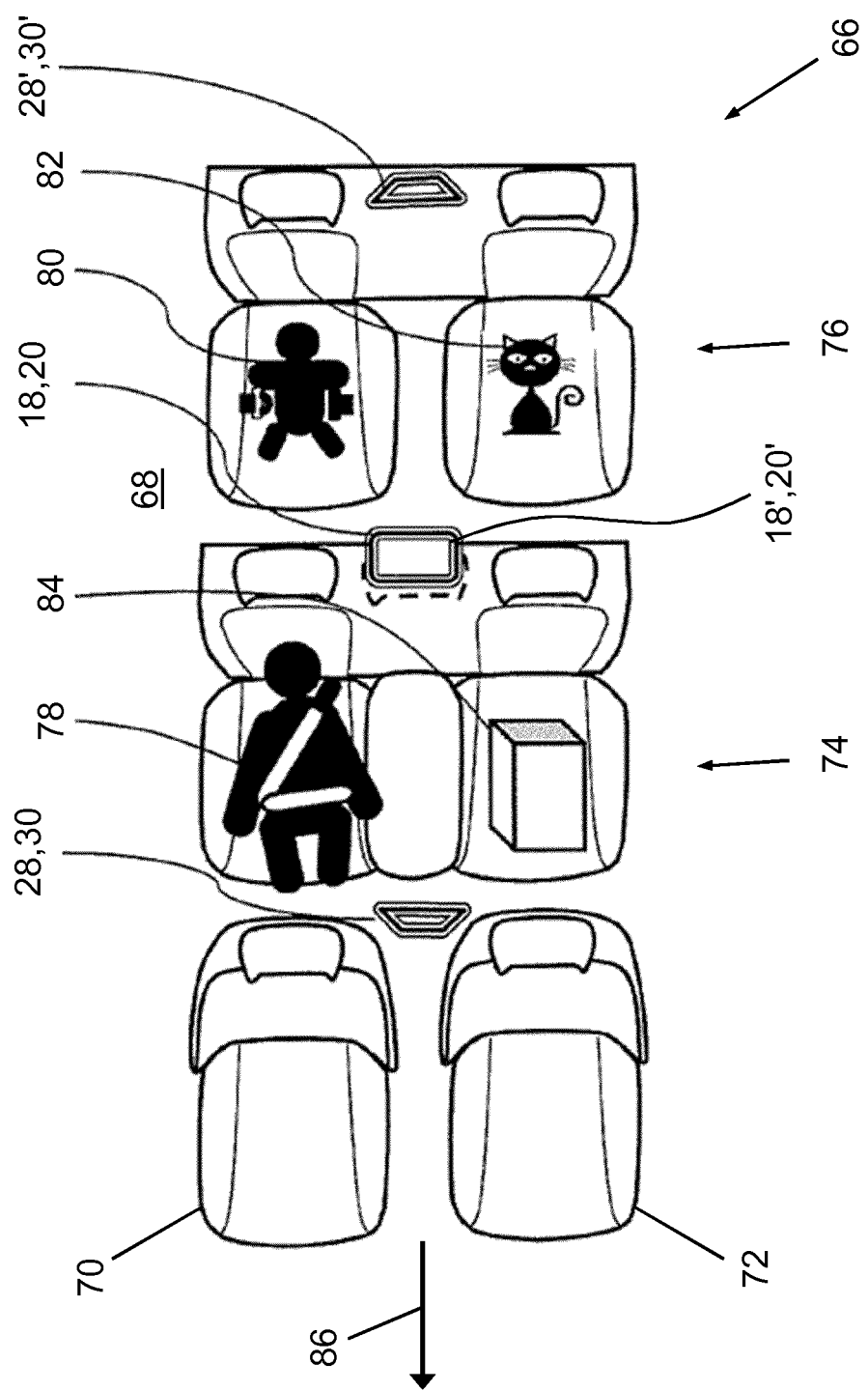
FIG. 3 is a schematic illustration of an alternative embodiment of the polarimetric radar system in accordance with the invention installed in the vehicle pursuant to FIG. 2, in a top view, FIG. 4 schematically shows a transmitting footprint and a receiving footprint of the polarimetric radar system pursuant to FIG. 3 in an installation in the vehicle, in a top view.

FIG. 3 is a schematic illustration of an alternative embodiment of the polarimetric radar system in accordance with an embodiment of the invention installed in the vehicle 66 pursuant to FIG. 2, in a top view. In order to avoid repetition, only differences with respect to the first embodiment will be described. For features that are not described, reference is made to the description of the first embodiment.

In contrast to the first embodiment 10 of the polarimetric radar system, the alternative embodiment of the polarimetric radar system comprises two radar transmitter units, wherein each of the radar transmitter units is designed identically to the radar transmitter unit 12 of the first embodiment 10 of the polarimetric radar system, and two radar receiving units, wherein each of the radar receiving units is designed identically to the radar receiving unit 22 of the first embodiment 10 of the polarimetric radar system.

The transmitting antennas 18, 20, 18', 20' of the two radar transmitter units are arranged at the roof of the interior 68 of the vehicle 66 at a center position above the seats of the middle seat row 74. The two transmitting antennas 18, 20 of a first one of the two radar transmitter units are directed in the normal driving direction 86 in an orientation that is somewhat tilted towards the floor of the interior 68. The first radar transmitter unit is thus configured for transmitting radar waves of horizontal and vertical polarization to partially cover the interior 68 of the vehicle 66, namely the middle seat row 74. The two transmitting antennas 18', 20' of a second one of the two radar transmitter units are directed opposite to the normal driving direction 86 in an orientation that is somewhat tilted towards the floor of the interior 68. The second radar transmitter unit is thus configured for transmitting radar waves of horizontal and vertical polarization to partially cover the interior 68 of the vehicle 66, namely the rear seat row 76.

The receiving antennas 28, 30 of a first one of the two radar receiving units are arranged at the roof of the interior 68 of the vehicle 66 at a center position above the front seats 70, 72, with their main sensitivity lobes pointing mainly opposite to the normal driving direction 86, and suitably tilted towards the floor of the interior 68. The first one of the two radar receiving units is therefore configured for receiving radar waves of horizontal and vertical polarization that are generated from radar waves transmitted by the first one of the two radar transmitting units and reflected or scattered by objects 78, 84 located in the middle seat row 74 of the vehicle 66.

The receiving antennas 28', 30' of a second one of the two radar receiving units are arranged at the roof of the interior 68 of the vehicle 66 at a center position above the seats of the rear seat row 76, with their main sensitivity lobes pointing mainly in the normal driving direction 86, and suitably tilted towards the floor of the interior 68. The second one of the two radar receiving units is therefore configured for receiving radar waves of horizontal and vertical polarization that are generated from radar waves transmitted by the second one of the two radar transmitting units and reflected or scattered by objects 80, 82 located in the rear seat row 76 of the vehicle 66.

By this arrangement of two pairs of radar transmitting antennas 18, 20, 18', 20' and two pairs of radar receiving antennas 28, 30, 28', 30', shadow effects can effectively be avoided.

Figure 4:
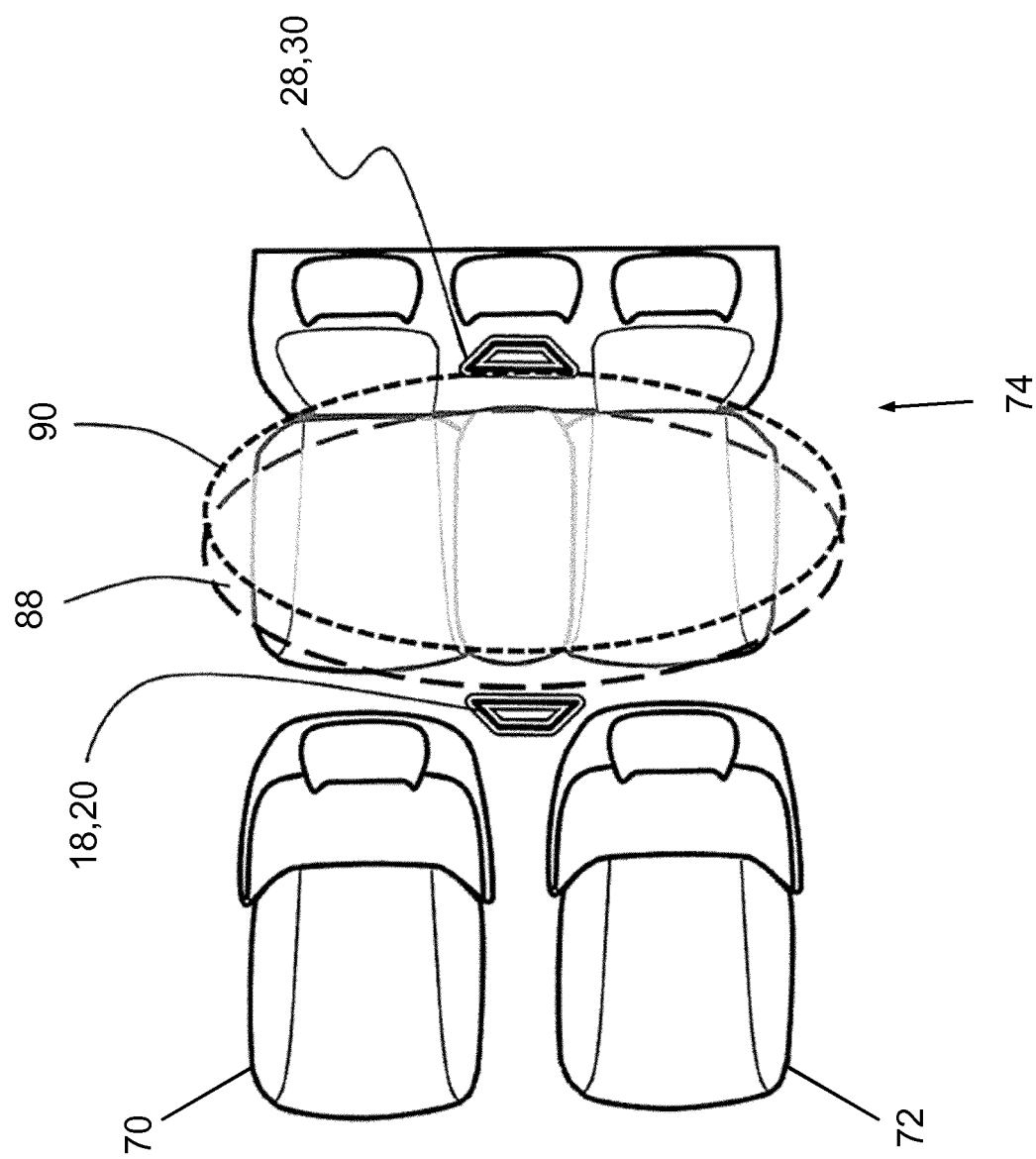

FIG. 4 schematically shows a transmitting footprint 88 generated by the first radar transmitting unit and a receiving footprint 90 of the first radar receiving unit of the polarimetric radar system pursuant to FIG. 3 in an installation in the vehicle 66 in a top view.

Figure 5:
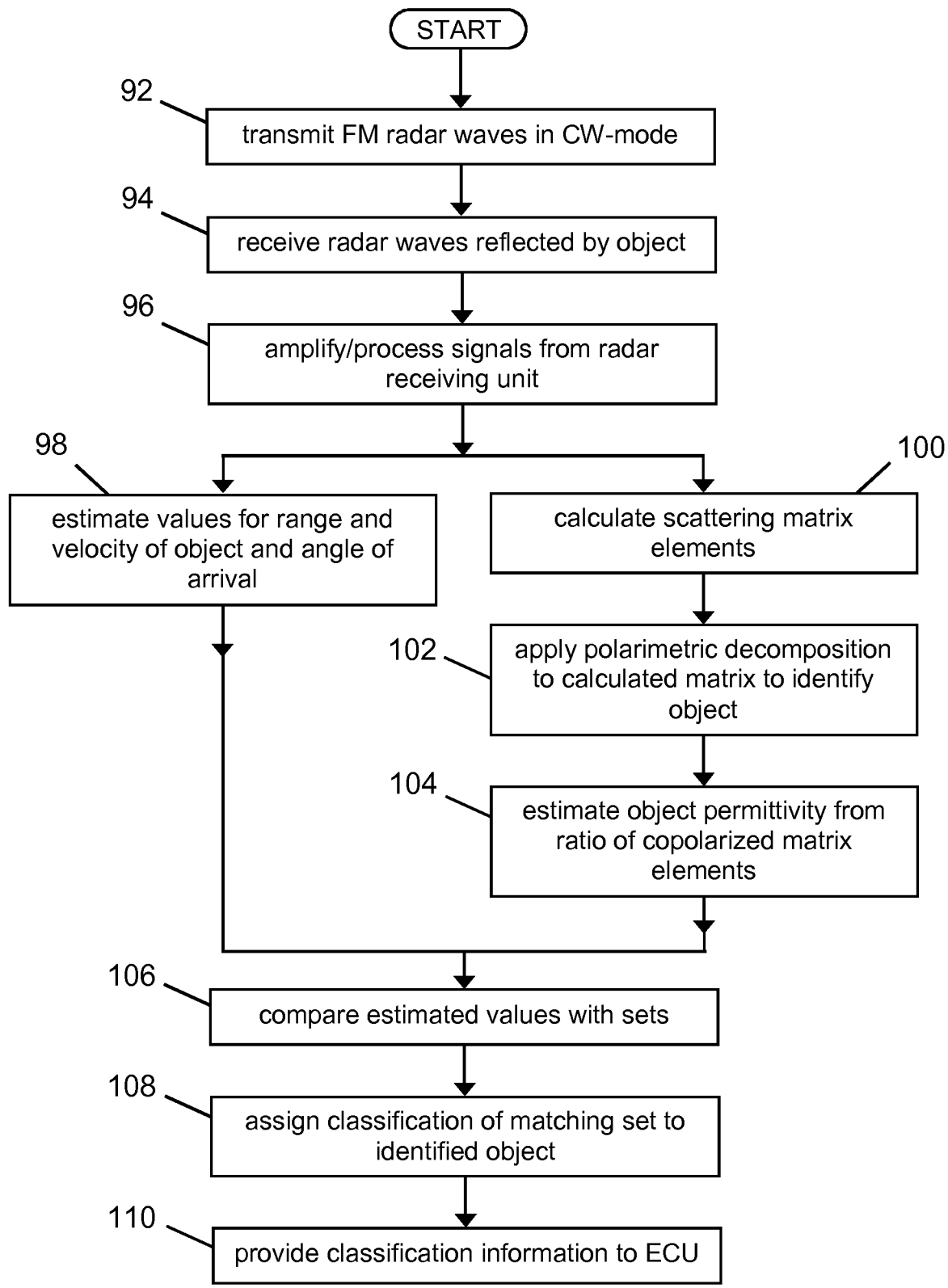
FIG. 5 is a flowchart of an embodiment of a method in accordance with the invention, and FIG. 6 schematically shows a diagram of evaluating radar waves received by the radar receiving unit of the polarimetric radar system pursuant to FIG. 1.
Figure 6:
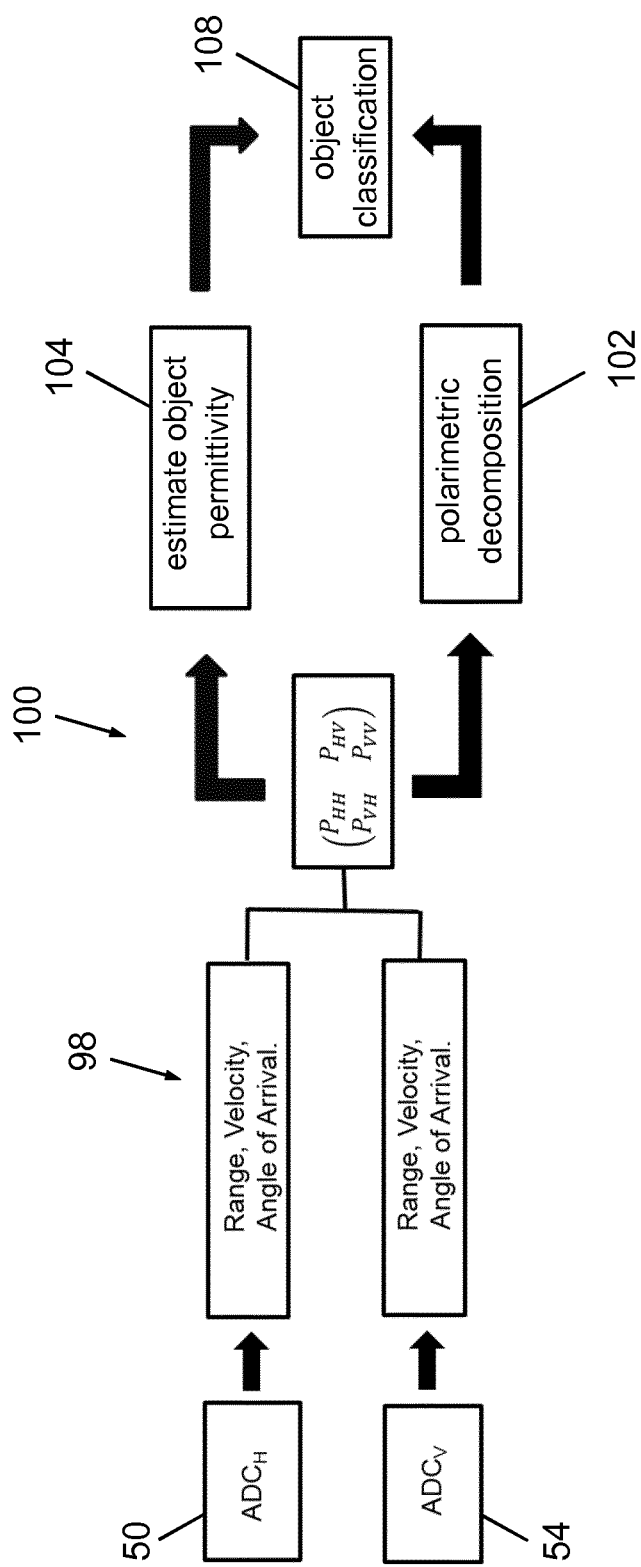

In the following, an embodiment of a method of classifying objects 78, 80, 82, 84 positioned in the interior 68 of the vehicle 66 by using the polarimetric radar system 10 pursuant to FIG. 1 will be described with reference to FIGS. 5 and 6. FIG. 5 provides a flowchart of the method as a whole, whereas a detailed diagram of signal evaluating and object classifying as part of the method is given in FIG. 6. In preparation of operating the polarimetric radar system 10, it shall be understood that all involved units and devices are in an operational state and configured as illustrated in FIGS. 1 and 2.

In order to be able to carry out the method automatically and in a controlled way, the microcontroller 58 comprises a software module 64 (FIG. 1). The method steps to be conducted are converted into a program code of the software module 64. The program code is implemented in the digital data memory unit 62 of the microcontroller 58 and is executable by the processor unit 60 of the microcontroller 58. The software module 64 also includes a subroutine for performing a polarimetric decomposition of a scattering matrix. Execution of the method may be initiated by starting the vehicle engine.

Referring now to FIG. 5, as a first step 92 of the method, illuminating a portion of the interior 68 of the vehicle 66 with frequency-modulated radar waves having horizontal polarization and with frequency-modulated radar waves having vertical polarization by simultaneously providing continuous-wave radar power to the two transmitting antennas 18, 20 commences.

Radar waves having horizontal polarization and radar waves having vertical polarization that are reflected by an object 78, 80, 82, 84 to be classified are received by the radar receiving unit 22 in another step 94, and the generated signals are amplified and signal-processed by the signal processing circuitry 38 as described above, in the following step 96.

In the next step 98 of the method, values for a set of predetermined object parameters are estimated on the basis of the received radar waves. The set of predetermined object parameters comprises a distance between the object 78, 80, 82, 84 and the radar receiving antennas 28, 30 (range), the velocity of the object 78, 80, 82, 84 relative to the radar receiving antennas 28, 30 and an angle of arrival of the radar waves reflected by the object 78, 80, 82, 84 to be classified.

In another step 100 of the method, elements of a scattering matrix are calculated on the basis of the received radar waves. The matrix contains all the information about the reflection process and the objects 78, 80, 82, 84 and comprises elements of copolarized radar power (co-polarized: transmitted and received polarizations are the same) derived from the measurement of the radar waves reflected by the objects 78, 80, 82, 84.

In another step 102 of estimating values for a set of predetermined object parameters, the subroutine for performing a polarimetric decomposition is applied to the calculated matrix, and the objects 78, 80, 82, 84 are identified from the polarimetric decomposition.

From a ratio of the elements of copolarized radar power reflected by the objects 78, 80, 82, 84, a permittivity of the objects 78, 80, 82, 84 is estimated as a value for another parameter that forms part of the set of predetermined object parameters in another step 104 of estimating values.

In the next step 106 of the method, the estimated values for the set of predetermined object parameters are compared with a plurality of predetermined sets of object parameters. For each object parameter of the set of object parameters, a predetermined range resides in the digital data memory unit 62. The step 106 of comparing includes to check if the estimated value for an object parameter lies within the predetermined range for the object parameter, for all parameters of the set of object parameters. If this condition is fulfilled for a specific predetermined set of object parameters, the estimated values are said to match the specific predetermined set of object parameters.

Upon detecting a match of the estimated values for the set of object parameters with a specific predetermined set out of the plurality of predetermined sets of object parameters, the class corresponding to the specific predetermined set is assigned to the identified object 66 in another step 108.

Then, in a further step 110 of the method, an information that is indicative of the classified objects 78, 80, 82, 84 is provided to an electronic control unit ECU of the vehicle 66 if the vehicle engine is in operation, or may be provided, depending on a fulfilment of additional conditions, to a remote telecommunication means if the vehicle engine is not in operation. In the former case, the information is used for the purpose of a seat belt reminder (SBR) system or an activation control for an auxiliary restraint system (ARS) such as an air bag system. In the latter case, the information can be used to confirm a presence of the classified object 78, 80, 82, 84 in the interior 68 of the vehicle 66, or may serve to alert help in case of a left-behind pet or child.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, which is meant to express a quantity of at least two. The mere fact that certain measures are recited in mutually different dependent claims does not indicate that a

The invention claimed is:

1. A polarimetric radar system for detecting and classifying objects positioned in an interior of a vehicle, the radar system comprising:
   at least one radar transmitter unit that is configured to transmit radar waves of at least two different polarizations,
   at least one radar receiving unit that is configured to receive radar waves of at least two different polarizations,
   a radar signal generating unit that is configured to generate and to provide radar waves to be transmitted by the at least one radar transmitter unit,
   a signal processing circuitry that is configured to process the generated radar waves to be transmitted and the received radar waves, and
   a signal evaluation unit that is configured:
      to receive processed signals from the signal processing circuitry,
      to estimate a value for a permittivity of an object on the basis of the received processed signals,
      to select an object class that corresponds to a specific permittivity out of a plurality of permittivities from a plurality of predetermined object classes upon detecting a match of the estimated value of permittivity with the specific permittivity, and
      to provide an information that is indicative of the at least one classified object.

2. The polarimetric radar system as claimed in claim 1, wherein the signal evaluation unit is configured to estimate values for a set of predetermined object parameters, including the permittivity of the object, on the basis of the received processed signals and to select an object class that corresponds to a specific predetermined set of object parameters, including the permittivity of the object, out of a plurality of predetermined sets of object parameters from a plurality of predetermined object classes upon detecting a match of the estimated values for the set of object parameters with the specific predetermined set of object parameters.

3. The polarimetric radar system as claimed in claim 1, further comprising modulation means for generating frequency-modulated radar waves to be transmitted by the at least one radar transmitter unit, and comprising demodulation means for demodulating the received radar waves.

4. The polarimetric radar system as claimed in claim 1, wherein the signal evaluation unit includes a microcontroller having at least one processor unit and at least one digital data memory unit to which the processor unit has data access.

5. The polarimetric radar system as claimed in claim 1, wherein the at least one radar transmitter unit comprises at least one transmitting antenna that is arrangeable in the interior of the vehicle, and wherein the at least one radar receiving unit comprises at least one receiving antenna that is arrangeable in the interior of the vehicle.

6. The polarimetric radar system as claimed in claim 1, wherein the signal evaluation unit is configured to select an object class from a plurality of predetermined object classes in real time.

7. The polarimetric radar system as claimed in claim 1, wherein the at least one radar transmitter unit comprises a plurality of transmitting antennas and/or the at least one radar receiving unit comprises a plurality of receiving antennas.

8. A method of classifying at least one object positioned in an interior of a vehicle by using a polarimetric radar system as claimed in claim 1, the method comprising steps of:
   (a) illuminating the interior of the vehicle with radar waves having at least two different polarizations,
   (b) receiving radar waves of at least two different polarizations that are reflected by the at least one object to be classified,
   (c) estimating values for a set of predetermined object parameters including a permittivity of the object on the basis of the received radar waves,
   (d) comparing the estimated values for a set of predetermined object parameters with a plurality of predetermined sets of object parameters,
   (e) upon detecting a match of the estimated values for the set of object parameters, including the permittivity of the object, with a specific predetermined set out of the plurality of predetermined sets of object parameters, assigning the class corresponding to the specific predetermined set to the at least one object, and
   (f) providing an information that is indicative of the at least one classified object.

9. The method as claimed in claim 8, wherein the step of illuminating the vehicle interior comprises illuminating the vehicle interior with frequency-modulated continuous radar waves.

10. The method as claimed in claim 8, wherein the step of estimating values for a set of predetermined object parameters includes estimating a position of the at least one object with respect to the vehicle interior.

11. The method as claimed in claim 8, wherein the permittivity of the object is estimated from a copolarized ratio of radar power derived from the measurement of the radar waves reflected or scattered by the at least one object.

12. The method as claimed in claim 11, wherein permittivity of the object is estimated from a copolarized ratio of radar power derived from the measurement of the radar waves reflected by the object in the specular direction.

13. The method as claimed in claim 8, wherein the step of estimating values for a set of predetermined object parameters includes a step of performing a polarimetric decomposition of a matrix formed by making use of the received radar waves, and identifying at least one object from the polarimetric decomposition.

14. A non-transitory computer-readable medium for controlling automatic execution of the method as claimed in claim 8, wherein method steps are stored on the computer-readable medium as a program code, which is executable by a processor.

* * * * *